United States Patent [19]

Smith

[11] Patent Number: 5,529,153
[45] Date of Patent: *Jun. 25, 1996

[54] TILT CONTROL APPARATUS FOR VEHICLES

[76] Inventor: Stewart G. Smith, Cloud Farm, Nine Gates Rd., Yorklyn, Del. 19736

[*] Notice: The term of this patent shall not extend beyond the expiration date of Pat. No. 5,437,354.

[21] Appl. No.: 508,613

[22] Filed: Jul. 28, 1995

Related U.S. Application Data

[63] Continuation-in-part of Ser. No. 195,903, Feb. 10, 1994, Pat. No. 5,437,354, which is a continuation of Ser. No. 89,238, Jul. 12, 1993, abandoned.

[51] Int. Cl.$^6$ ........................................... F16F 9/46
[52] U.S. Cl. ................ 188/299; 188/322.14; 188/315; 188/322.13; 267/221; 267/226
[58] Field of Search .................... 188/299, 300, 188/322.13, 322.14, 275, 279, 314, 315, 313, 316, 318; 280/714, 703, 709, 772, 840, 112.2, 112.1, 707, 6.12; 267/64.12, 64.15, 183–194, 221, 226; 340/440, 539, 689; 200/61.52

[56] References Cited

U.S. PATENT DOCUMENTS

| | | | |
|---|---|---|---|
| 4,325,468 | 4/1982 | Siorek | 188/322.14 |
| 5,437,354 | 8/1995 | Smith | 188/299 |

*Primary Examiner*—Douglas C. Butler
*Attorney, Agent, or Firm*—Herbert M. Wolfson

[57] ABSTRACT

In a vehicle having a transverse axle and a body, and a shock absorber mounted between the axle and the body to absorb shock from vertical movement of the axle and prevent shock from being transmitted completely to the body of the vehicle, the improvement disclosed involves an apparatus for sensing tilt of the vehicle in combination with apparatus in the hydraulic system of the shock absorber which will prevent further tilt of the vehicle beyond a predetermined point sensed by the sensing unit.

3 Claims, 8 Drawing Sheets

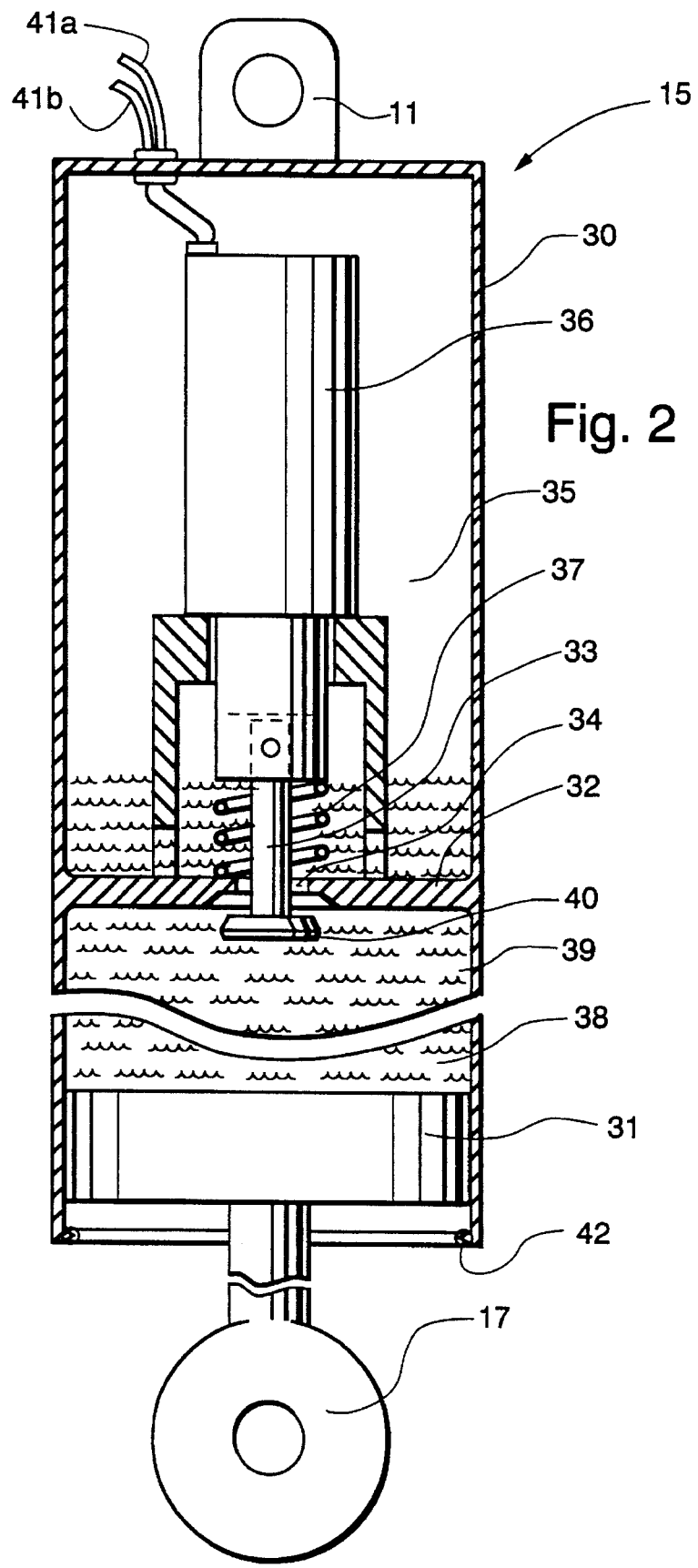

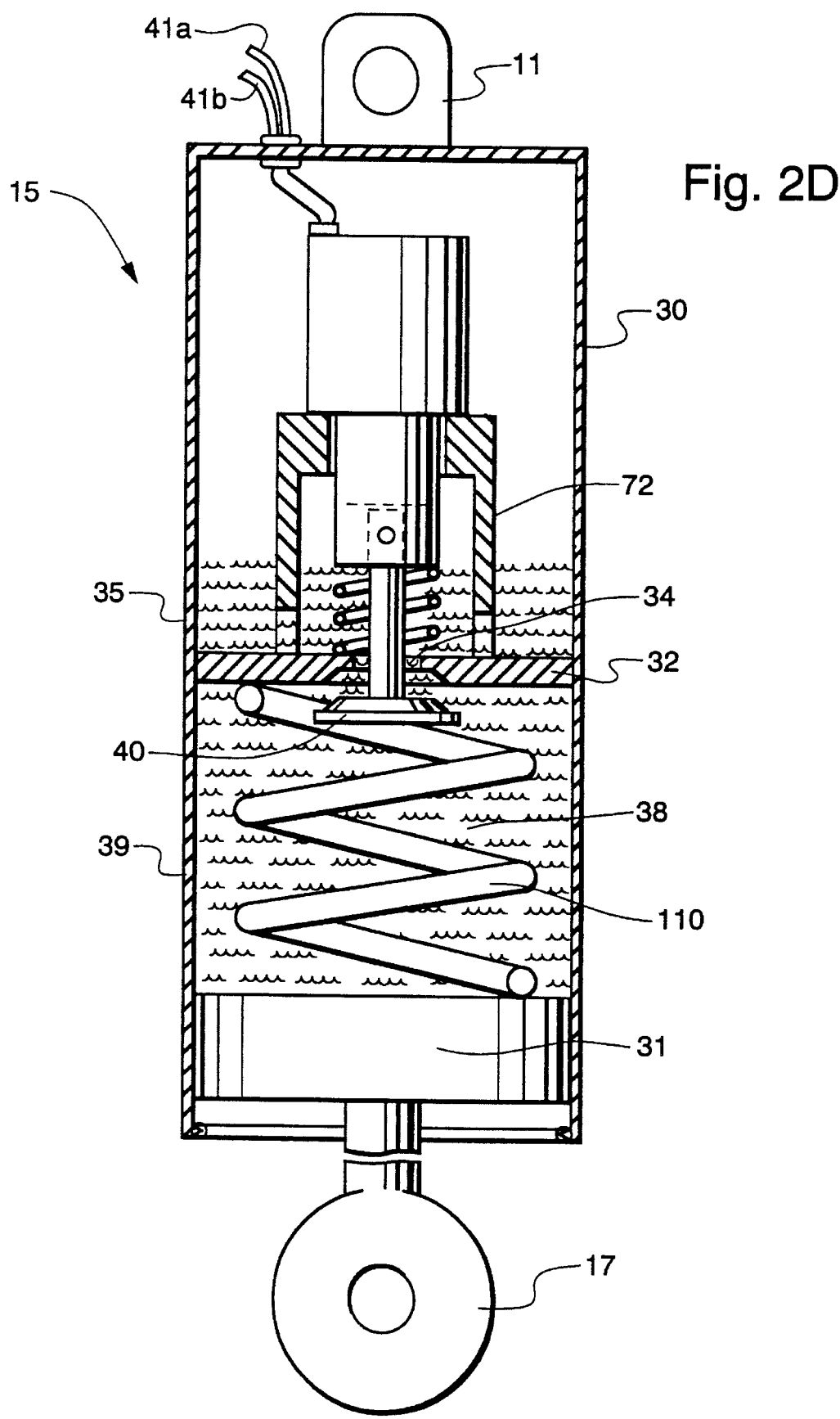

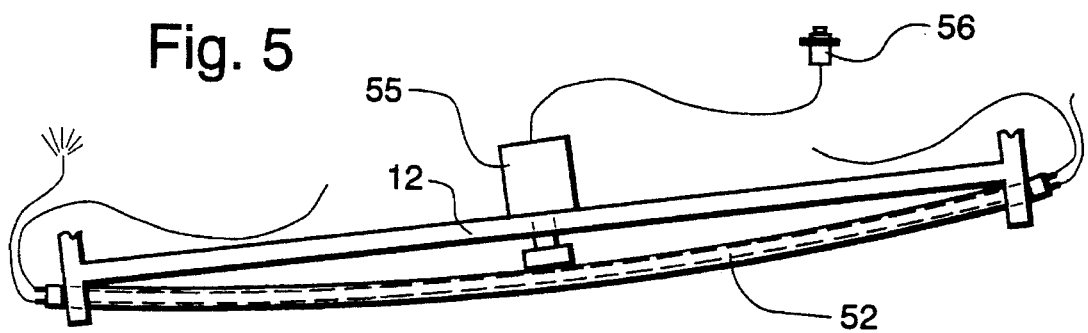
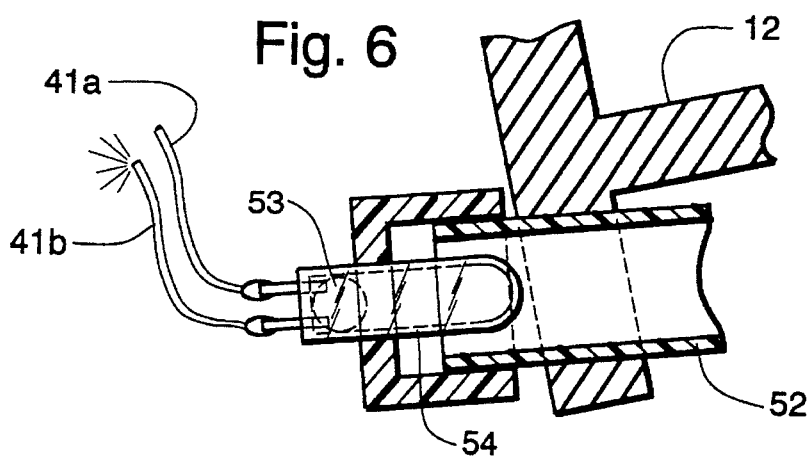
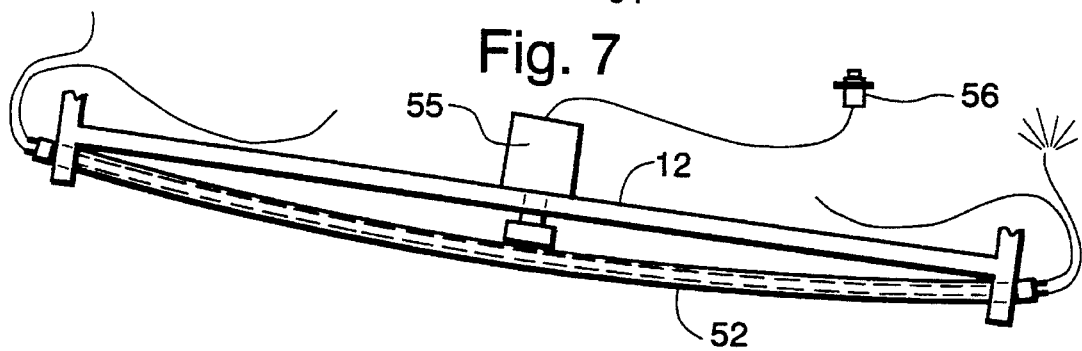
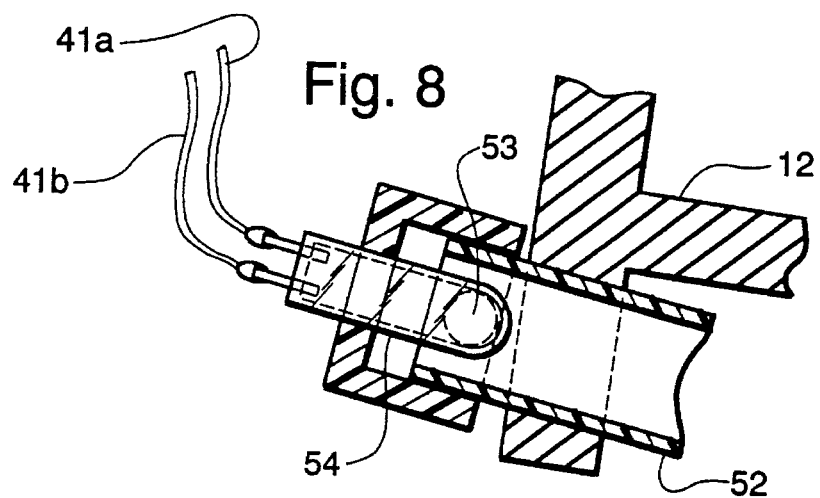

5,529,153

TILT CONTROL APPARATUS FOR VEHICLES

CROSS REFERENCE TO RELATED APPLICATIONS

This application is a continuation-in-part of U.S. patent application Ser. No. 08/195,903, filed Feb. 10, 1994, now U.S. Pat. No. 5,437,354 which was a continuation of U.S. application Ser. No. 08/089,238, filed Jul. 12, 1993, now abandoned.

FIELD OF THE INVENTION

The present invention relates to a suspension control system for automotive and railroad vehicles and the like. More particularly, the invention relates to a technology for suppressing vehicular rolling motion, i.e. the tendency of the vehicle to tilt when the vehicle turns a corner or is driven around a sharp curve, without destroying the comfortable ride provided by the conventional spring and shock absorber systems that compensate for the rapid upward and downward movements encountered when the vehicle travels over rough roads.

DESCRIPTION OF THE BACKGROUND ART

As shown in the prior art, the conventional spring and shock absorber system is used in automobiles to reduce shock or concussion when the vehicle strikes a bump or, in general, when the wheel movement of the vehicle over a roughness in the surface of the road moves the auto's axle toward the frame or body of the vehicle. The shock absorber is mounted between the automobile frame and the axles. It usually consists of a piston and dampening means inside a fluid-filled cylinder. When the wheel hits the bump, instead of the axle communicating the shock directly to the automobile frame, the piston is pushed upwardly or downwardly as in FIGS. 2A-2D and the fluid in the specially-designed cylinder, with or without additional shock dampening means, resists and decelerates the movement of the piston thus offsetting the force of the bump. The hydraulic fluid, rather than the frame, absorbs most of the shock. The ease with which the piston can compress the fluid determines the so-called "hardness" of the ride.

When a vehicle turns around a curve in the road, the suspension permits the vehicle body to rotate slightly about its longitudinal axis in response to the rolling force exerted on the body during the turn. Typically, vehicle passengers experience this effect as a tilt of the vehicle body, with the side of the body on the outside of the curve being relatively lower than the side of the body on the inside. Further, the vehicle body tends to pitch forward so that the front of the body is relatively lower than the rear. The pitch and roll combine to incline the vehicle body toward the front corner on the outside of the turn.

The prior art is replete with anti-roll systems that may be added to the conventional shock absorber systems. In general, these systems are complex requiring several additional pieces of equipment in a space that is already crowded. These systems counteract vehicle roll by providing lifting forces acting between the vehicle body and the axle or suspension on the outside of the curve or by providing a vehicle lowering force acting between the body and axle or suspension on the inside turn side of the vehicle. Some anti-roll systems in the prior art provide complementary lifting and lowering forces on both sides of the vehicle simultaneously with the accompanying array of equipment.

A typical tilt or sway control apparatus is shown in U.S. Pat. No. 2,934,353 issued in 1960 to L. B. d'Avigdor. In this apparatus, the inventor provides at each side of the vehicle, between the axle and the body, a body raising and lowering motor device including an expandable pneumatic chamber and means for supplying air to and discharging it from the chamber to regulate the volume of the chamber. This air supply and exhaust means is controlled by electrically operated valves in response to an electrically operated switch mechanism. The switch mechanism responds to centrifugal force and to gravity, and is thus affected by both tilting and lateral acceleration of the vehicle.

It is an object of the present invention to provide an improved tilt control apparatus, improved over the prior art in both effectiveness and in simplicity.

It is a further object to provide such apparatus that will not affect the vehicle body when the vehicle is subjected to roughness in the road, i.e. an apparatus that will not interfere with the vehicle's conventional shock absorber system.

It is still further object to also provide means for tilt control by modification of the vehicle's conventional shock absorber system.

Because of the large force generated by the tilt of the heavy vehicle, a strong support structure is necessary at the frame and at the axle for tilt control. Since the conventional shock absorbers in existing vehicles are usually placed in the strongest areas, it is also an object of this invention to incorporate the tilt-controller into the shock absorber systems currently in use, which will permit easy insertion into existing vehicles. Other objects will be apparent hereinafter.

SUMMARY OF THE INVENTION

The present invention provides a relatively simple, but effective sensing unit-tilt controller combination in a moving vehicle that permits the shock absorber system to insulate the body (and the passenger therein) against the sharp upward and downward movement due to road roughness on the straightaway, while also controlling the tilt or sway of the body of the vehicle when a sensing unit "senses" excessive lateral acceleration due to an excessive angular tilt in the road or movement around a curve when the vehicle sways to the outside; by a separate tilt controller or by modifying the activity of the shock absorber system.

Thus, in a shock absorber system for a movable vehicle system that depends upon a slidable piston mounted at one end of and within a chamber partially filled with fluid, wherein the piston comprises one end of the chamber and is attached to the body or to a transverse axle of the vehicle and the other end of the chamber is closed and attached to a transverse axle or body of the vehicle, this invention comprises the incorporation of a tilt-sensing means to sense the maximum tilt (or closest proximity of body to axle to be tolerated), means to communicate the maximum tilt to a means that prevents any further movement of the piston within the chamber that would increase the tilt of the vehicle by decreasing the distance between body and axle.

Specifically, in a vehicle having a transverse axle and a body, below which the axle is attached, the novel tilt controller or shock absorber-tilt controller is mounted between the axle and the body on one or both sides of the vehicle and comprises (1) means for sensing the tilt of the axle and the body (or frame attached thereto) as the vehicle is tilted, in combination with (2) means mounted between the axle and the body for shock dampening and for controlling the tilt of the vehicle so that as the tilt of said axle increases to a predetermined amount, the sensing means is activated to send a signal to the tilt controlling means that may be within the shock absorber means so that further tilt of the vehicle is prevented.

Basically, the shock absorber means depends upon a movable piston within a chamber containing a hydraulic fluid, the chamber mounted between the body and the axle of the vehicle. The piston is attached to either the body or the axle; and the fluid acts as a cushion as the piston and the body or axle, to which the piston is attached, is moved toward the corresponding axle or body, the amount of movement depending only upon the severity of the bump. The closer the body moves toward the axle, the greater the tilt that the vehicle experiences. The tilt controller takes over at a pre-set maximum tilt position to prevent further movement of the body toward the axle by completely preventing any further fluid flow within the chamber, and thus preventing any further movement of the piston (and the attached body or axle) toward the corresponding axle or body.

The preferred sensing mechanism is a mercury "switch". The switch may include a tube in the shape of a wide shallow "U" a pool of mercury within the tube and two sets of contacts at the opposite ends of the tube to be engaged by the mercury. The tube is mounted crosswise of the vehicle.

Alternatively, the switch may employ two balls of mercury, each within a glass envelope at each end of the U-shaped tube. Each ball is adapted to engage the set of electrical contacts at the ends of the tube when the tube tilts in its direction.

In a preferred embodiment, the curvature of the U-shaped tube (and hence the sensitivity of the tilt control operation) may be adjusted by an automated screw or similar mechanism located substantially at the center of the tube and which can be controlled by the driver of the vehicle.

The sensing unit may also be composed of a cylindrical tube with a ball bearing free to roll within the tube. The tube is similarly affixed to the bottom of the axle of the vehicle across its width. The tube is crimped, but not completely, at two points, one to the right of the center of the tube and one to the left, the points being predetermined to maintain the center of gravity of the vehicle at a position that will maintain the stability of the vehicle at a safe level.

The crimped portions, as the contacts in the previously-described mercury switch, are each, respectively, components of two electrical circuits adapted to control the flow of hydraulic fluid (and piston movement) in each of the shock absorber-tilt controllers. When the vehicle's body and axle tilt, the ball bearing moves in the direction of the tilt to the crimped portion to complete the circuit at the crimped portion. The electric current in the completed circuit activates a switch that can cause a valve or other means in the associated shock absorber-tilt controller to close, or move to prevent egress of hydraulic fluid within the chamber and any further movement of the piston within the chamber and its associated axle or frame toward its corresponding frame or axle. Thus, tilting of the vehicle to an unsafe level is prevented.

The tilt controller, which actually limits the swaying or tilting movement of the vehicle, comprises, on at least one side of the vehicle, hydraulic means consisting essentially of a chamber partially filled with fluid; a movable piston sealing the lower end of the chamber, integral with or attached to the transverse axle; the upper end of the chamber being closed and attached to or integral with the frame or body of the vehicle; a plate within the chamber having an opening (preferably substantially central) and so placed as to separate the fluid within the chamber into a lower portion and an upper portion; a movable sealing means or shut-off valve within the chamber adapted, when activated, to seal the central opening; means for moving the sealing means or valve into the closed position; means for sensing the tilting movement of said vehicle, (as previously described) electrically connected to the means for moving the sealing means whereby the sealing means is moved into the closed position when the sensing means is activated at a predetermined tilt position of the vehicle body to the axle to prevent further flow of the fluid from the lower portion of the chamber through the opening and into the upper portion of the chamber and, thus, prevent further tilting of the frame or body of the vehicle.

This apparatus preferably includes electromagnetic means and a spring assembly for operating the valve. An electrical switch controlled by the tilt of the sensing means and the movement of the electrically conductive material within the sensing means serves to energize the electromagnetic valve-operating means.

Thus, to modify a vehicle having a conventional shock absorber mounted between axle and body, the further improvement of this invention is an apparatus for both absorbing shock and for limiting the swaying and tilting movement of the vehicle comprising in one embodiment, on at least one side of the vehicle, a chamber partially filled with hydraulic fluid and having an upper end and a lower end, the lower end of the chamber being closed and attached to a transverse axle of the vehicle; a tubular structure, e.g. cylindrical, rectangular, hexagonal, etc. within and substantially concentric with, and attached to the chamber in such a manner that the fluid within the chamber can flow into the area separating the inner wall of the chamber and the outer wall of the concentric tubular structure; a movable piston slidably connected within the tubular structure and sealing the upper end of the chamber, and attached to the body; a lockplate assembly within the tubular structure having an opening, preferably substantially central, separating the fluid within the structure into a lower portion and an upper portion; optionally, dampening means between the face of the piston and the lower end of the chamber adapted to resist partially the downward movement of the piston, e.g. a series of plates having openings and pop-up valves or a spring, the plates or spring mounted between the piston and the lockplate assembly; movable sealing means within the structure and, when activated, adapted to seal the opening or openings through which fluid flows; means for moving the sealing means to seal the opening; means for sensing the tilting movement of the vehicle, electrically combined with means for moving the sealing means to seal the opening(s) when the sensing means is activated at a predetermined tilt position of the body of the vehicle to prevent flow of fluid from the upper portion of the tubular structure into the lower portion and into the area between the outer wall of the chamber and the concentric tube mounted within the chamber and, thus, prevent further movement of the piston and further tilting of the frame or body of the vehicle.

An alternative embodiment involves a movable piston sealing the lower end, instead of the upper end, of the partially filled chamber and attached to the transverse axle; the upper end of the chamber being attached to the body of the vehicle. Until a sealing means is activated, as described in the previous paragraph, by the sensing means being activated at a predetermined tilt position of the axle to prevent the piston from pushing fluid upwardly within the chamber, the assembly operates as a conventional shock absorber to dampen the upward and downward movement of the vehicle as it travels over the bumpy highway. When flow is prevented, no further movement of body toward axle can occur and tilt of the vehicle is controlled. An electromagnetic means and a spring assembly are usually combined to operate the sealing means. An electrical switch controlled by the means for sensing maximum tilt and the movement of the electrically conductive material within the sensing means serves to energize the electromagnetic means.

A third embodiment of the shock absorber-tilt controller of this invention, not unlike the first embodiment described hereinbefore, also involves a movable piston attached to the body of the vehicle. The piston is slidably mounted within the concentric tubular structure within the partially fluid-filled chamber, and adapted for downward movement. The closed lower end of the chamber is attached to the transverse axle of the vehicle. The downward movement of the piston forces fluid through a substantially central opening in a lockplate assembly that is fixably attached to the inner wall of the concentric tubular structure to cushion the shock caused by movement of the axle toward the body as the vehicle travels over bumpy roads. In the first embodiment, additional dampening of shock is obtained by placing a spring or other means to partially restrain the downward movement of the piston. In this embodiment, dampening is obtained by placing a relatively weak spring below a valve adapted to cover the central opening of the lockplate. The valve contains holes near its center point to permit further flow at a reduced rate to further cushion the shock. However, an additional plate, combined with a relatively small diameter but stronger spring, mounted below the valve and concentric with the axis of the valve acts as a sealing assembly when activated by the tilt-sensing means. Hence, when a predetermined maximum tilt position is sensed, the strong spring is activated by electrical means to push the plate over the holes in the valve blocking further flow of fluid through the holes. Further downward movement of the piston is prevented, as in any further movement of body toward axle or axle toward body.

BRIEF DESCRIPTION OF THE DRAWINGS

FIG. 2 is a vertical sectional detail of an embodiment of a tilt controller unit;

FIG. 2D is a vertical sectional detail of still another embodiment of the shock absorber-tilt controller system of the invention;

FIGS. 3, 5 and 7 are elevational views of one embodiment of a sensing device of the invention utilizing a curved cylindrical tube containing the mercury switch in three positions; FIG. 3, when the body of the vehicle is level; FIG. 5, when it tilts to the left; and FIG. 7, when it tilts to the right;

FIGS. 4, 6 and 8 are enlarged detail sectional views of the mercury switch; FIG. 4 shows the position of the switch at the left when the vehicle is level; FIG. 6, the position when the vehicle turns or leans to the left; and FIG. 8, when the vehicle tilts to the right.

DETAILED DESCRIPTION OF THE DRAWINGS

Figure 1:
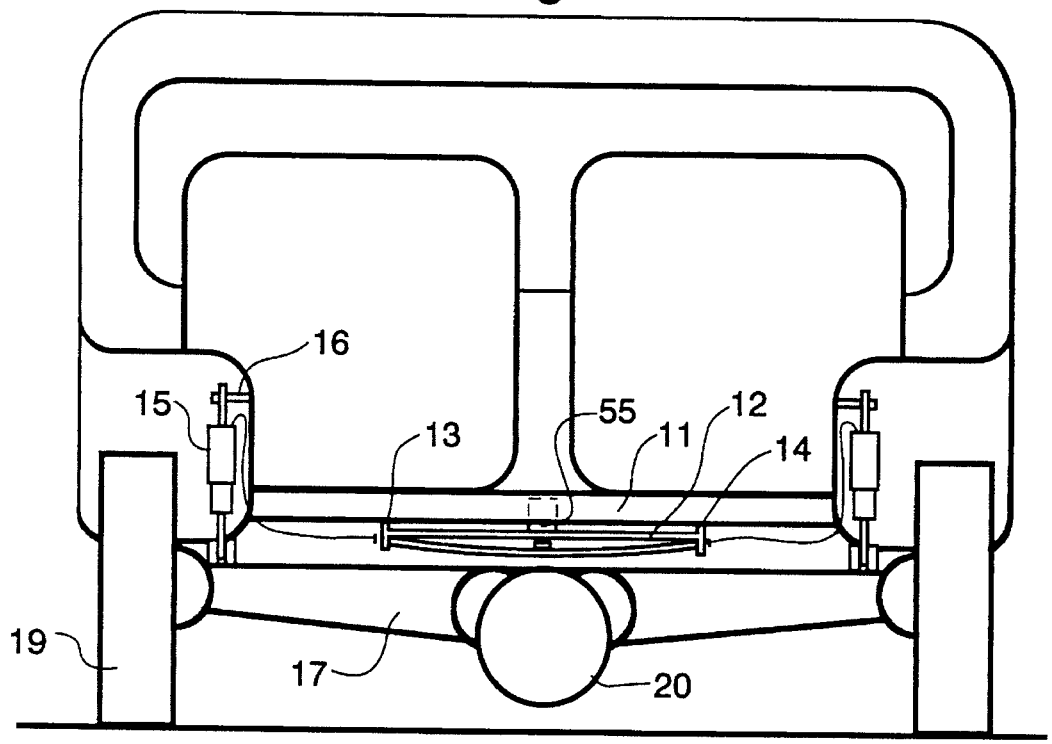
FIG. 1 is a cross-sectional view, somewhat diagrammatic, showing a vehicle equipped with the sensing unit for the tilt controller.

In FIG. 1, a schematic cross-section of the vehicle through one axle, the sensing unit 12 of the invention is shown attached to the body or frame of the vehicle 11 at positions 13 and 14. The shock absorber-tilt controller 15 is connected to the body 11 at position 16 and to the axle 17 at position 18. Connection may be accomplished by welding or by mechanical connectors, e.g. screws, bolts, etc. The wheels 19 are shown mounted on either end of axle 17 and connected to the vehicle's body 11 through conventional suspension means, not shown. The differential for axle 17 is shown at 20.

The tilt stabilizer 15, one for each side of the vehicle, is shown in cross-sectional; detail in FIG. 2. The stabilizer 15 is housed in casing 30. It is composed of a piston 31 within the casing, attached to the axle 17 below. Hydraulic fluid 38 is located within a chamber above the piston 31. When the vehicle hits a bump in the road, the fluid is forced past the lockplate 32 through opening 34. A seal 40, attached to a separate piston 33, does not close opening 34 since solenoid 36 is not activated when only a bump is encountered and there is no tilting of the vehicle. The hydraulic fluid 38 passes through the opening 34 into a reservoir chamber 35. Within the reservoir chamber, the solenoid device 36 is attached to the lockplate 32. The solenoid has a spring assembly 37 anchored to the back of the lockplate 32 and the solenoid's electrical wiring 41a and 41b communicates with the mercury switch of the sensing unit. The strength to cause blockage of fluid flow insures to the lockplate 32. Since the seal 40 is opened and the opening is quite large there is no resistance to compression or fluid flow when encountering a bump.

However, when tilting or unusual lateral acceleration is encountered, the sensing unit will activate the solenoid 36 and cause the seal 40 to close the opening 34 in the lockplate 32. No fluid then can flow from the lower chamber 39 into the reservoir chamber 35. This prevents any further downward movement or tilting of the body of the vehicle.

As stated previously, the body of the vehicle 11 is moved up and down by the jarring action of the axle 17. The action, after being transmitted through the conventional shock absorber system, not shown, is not sharp enough to upset the passengers within the vehicle nor sufficiently angular to activate the sensing unit of the tilt controller.

However, as axle 17 is tilted more and more by the tilt in the road or by the lateral acceleration of the vehicle around a curve in the road, the axle 17 forces the piston 31 deeper and deeper into the primary cylinder or lower chamber 39 with more and more fluid 38 flowing through opening 34 into overflow reservoir 35. The tilt of the body 11 approaches closer and closer to the tilt of the axle 17; and ultimately may shift the center of gravity of the vehicle, particularly for heavy trucks or vehicles carrying heavy loads, into an unstable position if not for the tilt controller 15.

Figure 3:
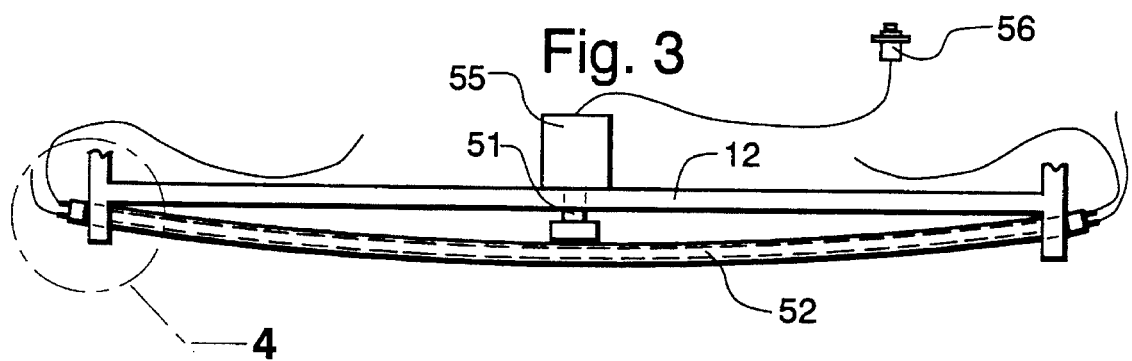
Figure 4:
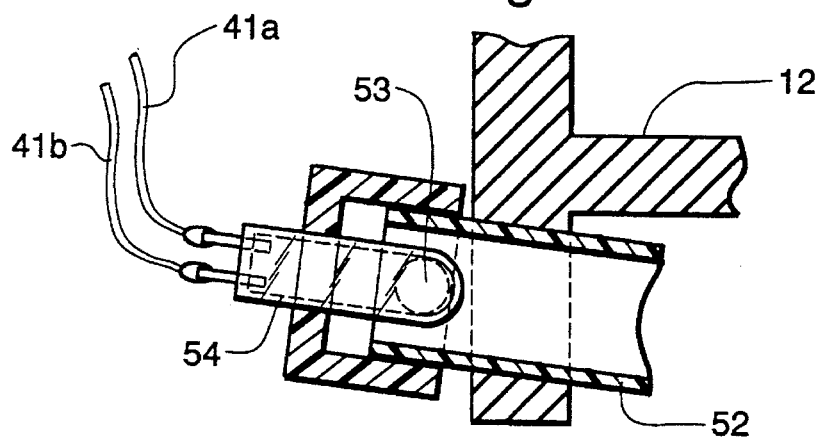

The tilt controller, shown at 15, electrically combined with the sensing device shown in FIGS. 3, 5 and 7, prevents the shift of the center of gravity from becoming uncomfortable or, possibly, fatal. Basically, the solenoid 36, activated by the electrical circuit which in turn was activated by the mercury switch, as shown in FIG. 6, serves to seal the opening 34 at a predetermined point in the tilting of the vehicle. This closure prevents any further flow of fluid 38 into reservoir 35; and also prevents any further tilt of body. Basically, the piston 31, which is now unable to move upwardly, restrains any further tilt of the body of the vehicle instantaneously.

The solenoid device 36 is composed of a rod or piston 33 that fits within the solenoid 36. It is usually spring loaded and attached to the lockplate 32 as shown in FIG. 2. The solenoid 36 is connected to the vehicle's electrical circuit through wires or other electrical connectors 41A and 41B, one to the vehicle's battery and the other to the sensing device 12, shown in greater detail in FIGS. 3, 5 and 7.

Figure 2A:
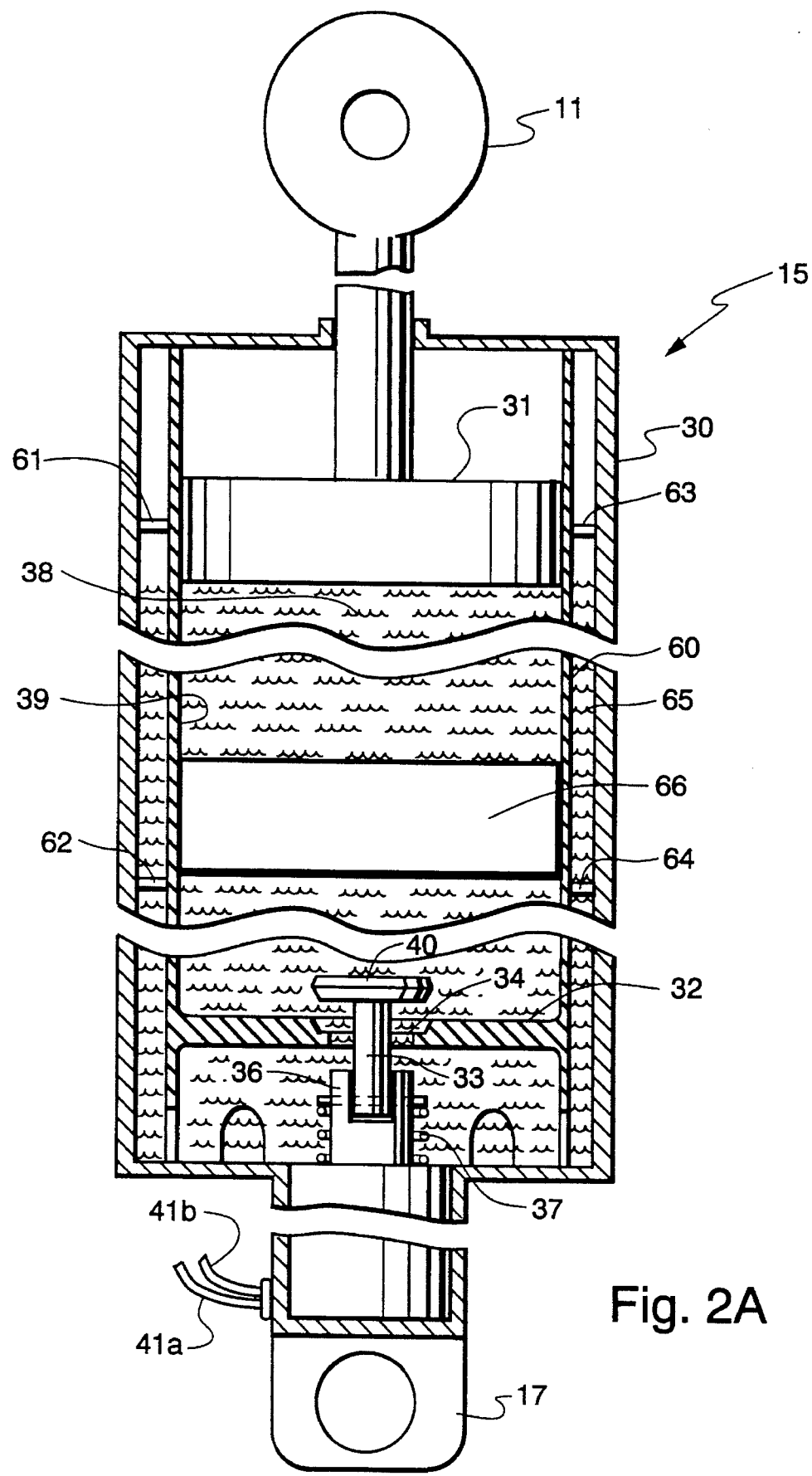
FIG. 2A is a vertical-sectional detail of one embodiment of the shock absorber-tilt controller system of the invention.

Four shock absorber-tilt controller combinations are shown in cross-sectional detail in FIGS. 2A–2D. In all cases, the shock absorber-tilt control stabilizer 15, as shown in FIG. 1, is housed in casing 30. In FIG. 2A, a cylindrical metal or plastic tube 60 is attached to the inner wall of casing 30 at two or more locations by connectors 61, 62, 63 and 64. Tube 60 concentric with casing 30 is sized to permit fluid to flow from within the tube into the area 65 between the inner wall of casing 30 and the outer wall of the cylindrical tube 60. The piston 31 adapted to fit within the tube 60 is attached to the frame or body 11 of the vehicle.

Hydraulic fluid 38 is located within the inner wall 39 below the piston 31 and also in the area 65 between casing 30 and tube 60. A shock dampening unit 66 as shown in detail in FIGS. 9A and 9B may be placed within tube 60 and above a lockplate 32. When the vehicle hits a bump in the road, the piston 31 is moved downwardly to force fluid past the lockplate 32 through the opening 34. A seal 40, attached to a separate piston 33, does not close opening 34 since solenoid 36 is not activated when only a bump is encountered without substantial tilting of the vehicle. The hydraulic fluid 38 passes through the opening 34 and then up into the area 65 which acts as the "reservoir chamber".

As shown in FIG. 2A, the solenoid device 36 may be attached to the bottom of chamber 30. The solenoid has a spring assembly 37 to maintain the opening 34 in the open position below the lockplate 32. The solenoid's electrical wiring 41a and 4lb communicates with the mercury switch of the sensing unit. While the seal 40 remains inactivated and if the opening 34 is quite large, there is little resistance to compression of the piston 31 or fluid flow through opening 34 when encountering a bump. To provide some dampening, a dampening unit 66 may be placed within the tube 60. The dampening unit 66 may comprise a series of springs and openings as shown in FIG. 9A or a series of plates having openings and pop-off valves as shown in FIG. 9B or may comprise a computer-operated motor acting on the piston 31 to decelerate its bump-induced movement.

Figure 9A:
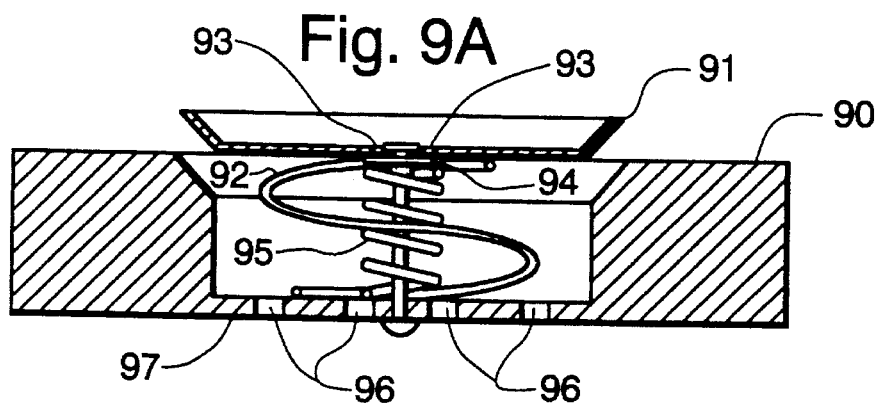
FIGS. 9A and 9B are vertical-sectional details of the shock-dampening means 66 shown in both FIGS. 2A and 2B.

The dampening unit shown in FIG. 9A is composed of a series of plates, valves and springs in a housing 90 affixed to the inner concentric tube 60 that operate to restrain the flow of fluid through opening 34 in FIG. 2A. Thus, when the shock is compressed, i.e. the distance between axle 11 and frame 17 is reduced, the piston 31 moves downwardly to force fluid downwardly. The fluid closes valves 91 by compressing a relatively weak spring 92. Valve 91 has openings or holes 93 surrounding its center which are blocked by plate 94. Plate 94 is held in place by a small diameter, but very strong spring 95. As pressure builds up based on the continued downward force of piston 31, spring 95 becomes compressed, the fluid flows through openings 93 and then through valved openings 96 in plate 97 and finally into the "reservoir" 65 between the inner wall of chamber 30 and the outer wall of tubular structure 60. When the shock extends, i.e. the axle 11 moves away from frame 17 of the vehicle, piston 31 moves upwardly; fluid is pulled from the outer chamber 65 to pass through openings 96 in plate 97 and through the open upper valve 91.

Figure 9B:
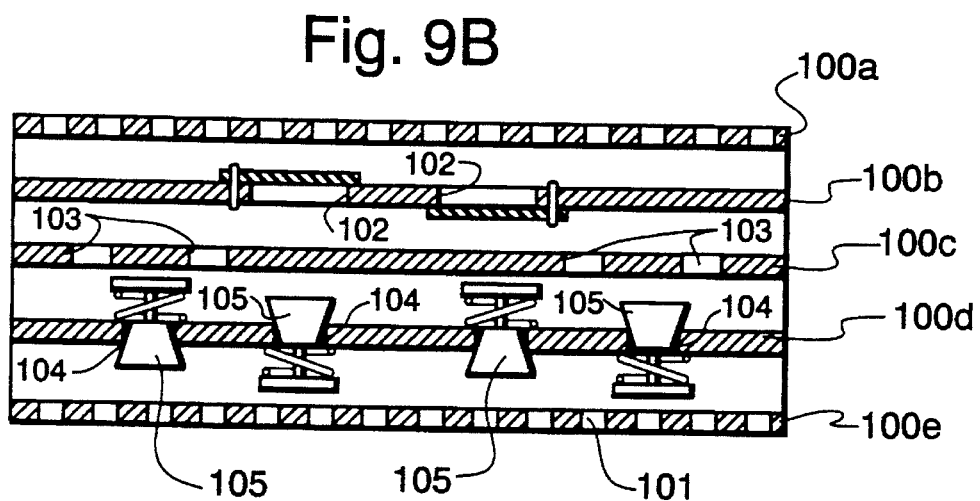

The dampening unit shown in FIG. 9B is composed of a series of five (5) plates 100a–e affixed to the inner wall of the tube as cylinder 60. The top and bottom plates 100a and 100e have a series of openings 101 arranged in substantially concentric circles. Plate 100b is shown with a centrally located "valved" opening(s) 102, which is pushed open by the downward force of the fluid in FIG. 2A. If the piston 31 is arranged to force fluid upwardly, as in FIG. 2B, then the "valve" or flexible plate would be placed above the opening(s) 102. Plate 100c is shown with a series of openings or holes 103, that are offset from the openings 101 and 102 arranged to provide additional resistance to fluid flow. Plate 100d is provided with a series of openings 104, each of which are provided with spring operated pop-off valves 105; some openings with valves adapted to resist downward flow and some adapted to resist upward flow.

Figure 2B:
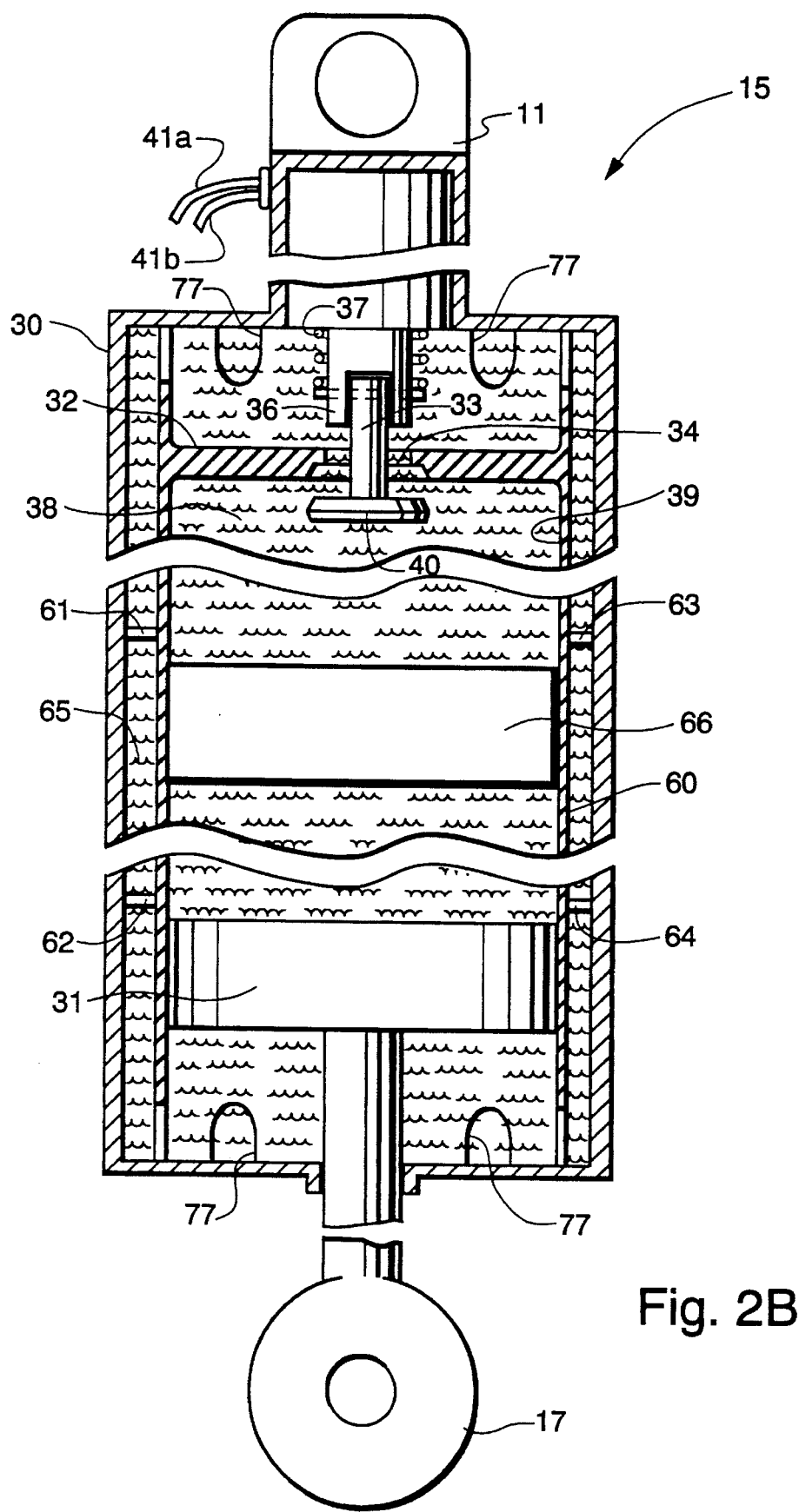
FIG. 2B is a vertical-sectional detail of another embodiment of the shock absorber-tilt controller system of this invention.

It should be understood that the above described shock dampening functions in FIGS. 9A and 9B are part of the described system in FIGS. 2A and 2B. When tilting or unusual lateral acceleration is encountered, the sensing unit 12 will activate the solenoid 36 and cause piston 33 to move downwardly activating the seal 40 to close the central opening 34 of the lockplate 32. No further fluid can flow from the chamber 39 up into the "reservoir chamber" 65. This prevents completely, any further movement of piston 31 and any accompanying downward movement of the body 11 or excessive tilting of the vehicle.

Alternatively, the system shown in FIG. 2A may be inverted to yield the system shown in FIG. 2B. It should be noted that the interior tubular structure 60 would be mounted within the chamber 39 so that opening(s) 77 would remain at the bottom as well as at the top of the chamber to permit fluid 38 to flow behind the piston 31. The piston 31 would be attached to the axle 17 while the chamber 39 would be attached to the body 11 of the vehicle. In all other respects, the operation would be similar to that shown for FIG. 2A.

To summarize, in normal operation the body of the vehicle 11 is moved up and down by the jarring action of the axle 17. The action, after being transmitted through the conventional shock absorber system as described above, is not sharp enough to upset the passengers within the vehicle nor sufficiently angular to activate the sensing unit of the tilt controller. However, as axle 17 is tilted more and more by the tilt in the road or by the lateral acceleration of the vehicle around a curve in the road, the body 11 forces the piston 31 deeper and deeper into the inner cylinder 60 with more and more fluid 38 flowing through opening 34 into overflow reservoir 65. As the body 11 approaches closer and closer to the axle 17, this tilt may ultimately shift the center of gravity of the vehicle, particularly in heavy trucks or vehicles carrying heavy loads, into an unstable position if not for the tilt sensing-controller system shown in FIG. 1.

The tilt controller is electrically combined with the sensing device as shown in FIGS. 3, 5 and 7, to prevent the shift of the center of gravity from becoming uncomfortable or, possibly, fatal. Basically, solenoid 36 in FIGS. 2A and 2B, is activated by the electrical circuit, which, in turn, was activated by the mercury switch, as shown in FIG. 6, and serves to seal the opening 34 at a predetermined and preset maximum for the tilting of the vehicle. This closure prevents any further flow of fluid 38 into "reservoir" 65; and also prevents any further tilt of the vehicle. Basically, the piston 31, which is now unable to move, restrains any further tilt of the body of the vehicle almost instantaneously. This instantaneous action compares to the relatively slow action of the prior art tilt control systems that employ separate motors to activate pumps to resist the force of compression caused by tilting. Furthermore, the use of a substantially non-compressible hydraulic fluid compared to the air used in some prior art systems is also important for the success of the systems of this invention.

The solenoid device 36 is composed of a rod or piston 33 that fits within the solenoid 36. It is usually spring loaded and attached to the sealing means 40 as shown in FIG. 2A. The solenoid unit 36 is connected to the vehicle's electrical system through wires or other electrical connectors 41a and 41b, one to the vehicle's battery and the other to the sensing device 12, as shown in greater detail in FIGS. 3, 5 and 7.

Figure 2C:
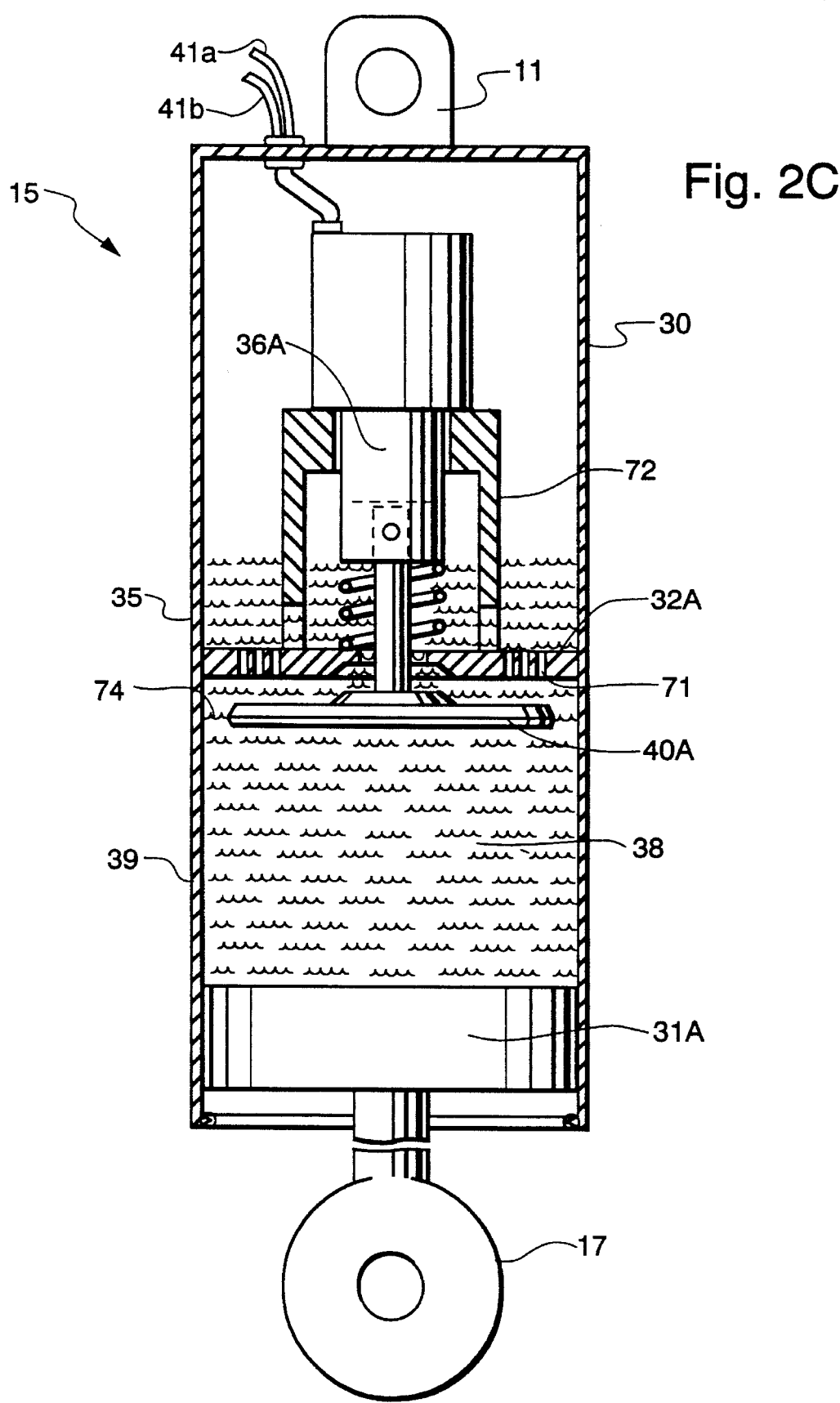
FIG. 2C is a vertical sectional detail of a third embodiment of the shock absorber-tilt controller system of this invention.
Figure 10:
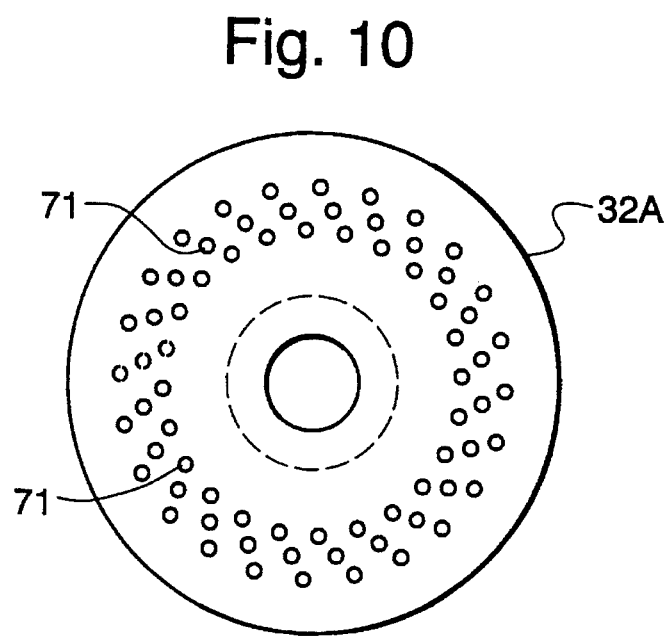
FIG. 10 is a top view of the lockplate used in the system shown in FIG. 2C.

Another alternative shock absorber-tilt controller system is shown in cross-sectional detail in FIG. 2C. In this system, casing 30 houses the system without any accompanying concentric cylinder within the casing. Instead, the plate 32A is composed of a series of openings 71 arranged in substantial circles around a central area of plate 32A through which the solenoid 36A is slidably mounted. A top view of plate 32A with its "Swiss cheese" appearance is shown in FIG. 10. During conventional shock absorber action, any upward movement of piston 31 (connected to axle 17) is cushioned by the resisting fluid 38 within the casing 30. It should also be noted that the sealing plate 40A is concentric with casing 30 but leaves a sizable gap 74 around its periphery to allow fluid around the plate 40A during shock absorption.

However, when excessive tilting or unusual lateral acceleration is encountered, the sensing unit will activate solenoid 36A and cause the sealing plate 40A to cover all the openings 71 in the plate 32A. No fluid can then flow from the lower chamber 39 into the reservoir chamber 35 and the piston 31A can no longer move. By preventing any further movement of the piston 31A, further tilting of the body of the vehicle is also prevented.

In FIG. 2D is shown a shock absorbed-tilt controller system similar to those shown in FIGS. 2 and 2C, i.e. without a concentric inner tubular structure and the piston arranged to force fluid upwardly. To provide dampening for the shock absorption function of the system, a mechanical spring 110 is affixed to the piston 31 and the plate 32 to further restrain movement of piston 31, thus, limiting the shock received by passengers in the vehicle.

The tilt controller function in FIG. 2D is accomplished substantially as in FIGS. 2 and 2C. The tilt sensing means sends its signal when excessive tilt is encountered; solenoid 36 is activated; sealing means 40 is drawn upwardly to seal the opening 34; flow of fluid and further movement of piston 31 ceases; and further tilt is prevented.

As shown in FIG. 3, the sensing unit 12 is composed of a cylindrical tube 52, usually non-electrically conductive plastic, but may be metallic, e.g. copper, steel, aluminum, or the like, if the inner surface is coated with an insulating material. The tube 52 is mounted transversely and substantially parallel to axle 17 and attached, with bolts or other means, to the frame or body 11 of the vehicle. The tube 52 although substantially parallel to the axle is formed as a shallow "U" with an adjustment screw 51 at about the half-way point of its length to permit changes in the sensitivity of the sensing unit 12.

At each end of tube 52 are mercury switches, each of which contains a ball of mercury 53 within a glass envelope 54. Each switch is electrically connected to the respective solenoids 36 associated with the units 15 at each wheel and the vehicle's battery through conducting wires 41A and 41B.

In a desirable embodiment, means may be provided within the interior of the vehicle by which the driver is able to control the sensitivity of the sensing unit. Specifically, as shown in FIG. 3, the adjustment screw 51, or any other equivalent means movable up and down and adapted to control the curvature of the U-shaped tube 50, may be moved by motor 55. The action of motor 55 is, in turn, controlled by an interior switch, diagrammically shown at 56, which may be easily activated by the driver in anticipation of hazardous road conditions.

In any event, when the vehicle tilts sufficiently to the left, as shown in FIGS. 5 and 6, the ball 53 in the switch on the left rolls to the left to complete the electrical circuit to the tilt controller or stabilizer 15 on the left side of the vehicle. Solenoid 36 is activated and the spring biased-valve shuts off flow of hydraulic fluid from the primary cylinder to the reservoir; and further vertical movement of the left side of the body 12 is prevented. When the vehicle returns to its normal position, the ball 53 rolls from its contact with wires 41a and 41b to its normal position. The hydraulic pressure combines with the expansion of the spring 37 (due to release of the compressive force from the solenoid) to permit the seal to pull away from lockplate and allowing fluid to again flow freely through the opening.

The foregoing series of operations occur for tilting of the vehicle to the right, as shown in FIGS. 7 and 8. The electrical circuit is completed through the mercury switch positioned at the right, which activates the solenoid and closes the valve in the unit 15 on the right side of the vehicle.

While I have shown and described the preferred embodiments of my invention, other modifications may occur to those skilled in the art. Therefore, I intend that my invention be limited only by the claims which follow:

What is claimed:

1. In a shock-absorbing system for a vehicle having a transverse axle and a body that comprises, on at least one side of the vehicle, a chamber partially or fully filled with hydraulic fluid and a movable piston at one end of said chamber attached to said transverse axle; the other end of the chamber being attached to said body of the vehicle; a plate within said chamber having at least one opening separating the fluid within the chamber into two portions; and means for dampening the movement of the piston when the piston is compressed or extended; the improvement which comprises a movable sealing means within said chamber which, when activated, seals said at least one opening in said plate; means for moving the sealing means to seal said opening in said plate; means for sensing the tilting movement of said vehicle, combined with said means for moving the sealing means to seal said opening when the sensing means is activated at a set tilt position of the body to prevent flow of said fluid from one portion of the chamber into the other portion of the chamber and thus prevent movement of the piston and further tilting of the body of the vehicle.

2. An apparatus as in claim 1 wherein said portions of fluid are located one above the other and said plate is between said portions of fluid.

3. An apparatus as in claim 1 wherein said portions of fluid are each located within one of two concentric inner and outer tubular structures, the fluid adapted to flow from within an area between the inner structure and the inner structure to the outer structure, said plate and said opening therein being below the inner tubular structure and said sealing means adapted to seal said opening to prevent fluid from flowing from the inner concentric structure to the area between the inner structure and the outer concentric structure.

* * * * *

(12) EX PARTE REEXAMINATION CERTIFICATE (10036th)

United States Patent
Smith

(10) Number: US 5,529,153 C1
(45) Certificate Issued: Feb. 12, 2014

(54) TILT CONTROL APPARATUS FOR VEHICLES

(75) Inventor: Stewart G. Smith, Yorklyn, DE (US)

(73) Assignee: Cloud Farm Associates L.P., Yorklyn, DE (US)

Reexamination Request:
No. 90/012,725, Nov. 26, 2012

Reexamination Certificate for:
Patent No.: 5,529,153
Issued: Jun. 25, 1996
Appl. No.: 08/508,613
Filed: Jul. 28, 1995

Related U.S. Application Data

(63) Continuation-in-part of application No. 08/195,903, filed on Feb. 10, 1994, now Pat. No. 5,437,354, which is a continuation of application No. 08/089,238, filed on Jul. 12, 1993, now abandoned.

(51) Int. Cl.
*F16F 9/46* (2006.01)

(52) U.S. Cl.
USPC .................. 188/266.2; 188/315; 188/322.13; 188/322.14; 267/221; 267/226

(58) Field of Classification Search
USPC ................... 188/299.1, 322.13, 322.14, 315; 280/124.104, 124.106, 124.112, 777; 180/274; 267/221, 226
See application file for complete search history.

(56) References Cited

To view the complete listing of prior art documents cited during the proceeding for Reexamination Control Number 90/012,725, please refer to the USPTO's public Patent Application Information Retrieval (PAIR) system under the Display References tab.

*Primary Examiner* — Matthew C. Graham

(57) ABSTRACT

In a vehicle having a transverse axle and a body, and a shock absorber mounted between the axle and the body to absorb shock from vertical movement of the axle and prevent shock from being transmitted completely to the body of the vehicle, the improvement disclosed involves an apparatus for sensing tilt of the vehicle in combination with apparatus in the hydraulic system of the shock absorber which will prevent further tilt of the vehicle beyond a predetermined point sensed by the sensing unit.

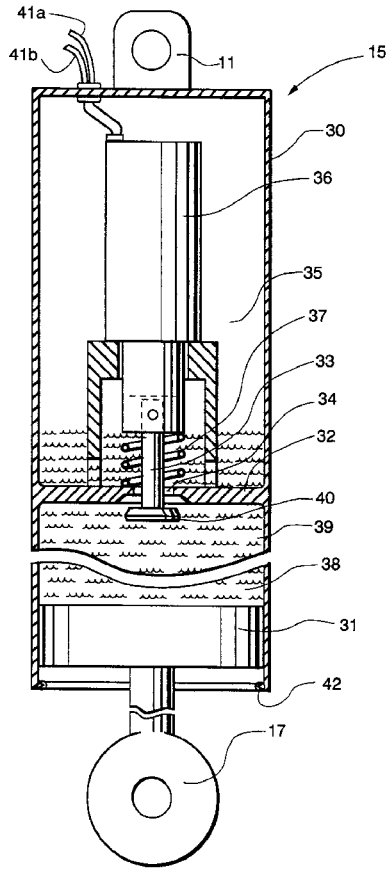

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

\* \* \* \* \*

(12) EX PARTE REEXAMINATION CERTIFICATE (10320th)
United States Patent
Smith

(10) Number: US 5,529,153 C2
(45) Certificate Issued: Oct. 9, 2014

(54) TILT CONTROL APPARATUS FOR VEHICLES

(75) Inventor: Stewart G. Smith, Yorklyn, DE (US)

(73) Assignee: Cloud Farm Associates L.P., Yorklyn, DE (US)

Reexamination Request:
No. 90/013,157, Feb. 25, 2014

Reexamination Certificate for:
Patent No.: 5,529,153
Issued: Jun. 25, 1996
Appl. No.: 08/508,613
Filed: Jul. 28, 1995

Reexamination Certificate C1 5,529,153 issued Feb. 12, 2014

Related U.S. Application Data

(63) Continuation-in-part of application No. 08/195,903, filed on Feb. 10, 1994, now Pat. No. 5,437,354, which is a continuation of application No. 08/089,238, filed on Jul. 12, 1993, now abandoned.

(51) Int. Cl.
*F16F 9/46* (2006.01)

(52) U.S. Cl.
USPC ............... 188/266.2; 188/315; 188/322.13; 188/322.14; 267/221; 267/226

(58) Field of Classification Search
None
See application file for complete search history.

(56) References Cited

To view the complete listing of prior art documents cited during the proceeding for Reexamination Control Number 90/013,157, please refer to the USPTO's public Patent Application Information Retrieval (PAIR) system under the Display References tab.

*Primary Examiner* — William Doerrler

(57) ABSTRACT

In a vehicle having a transverse axle and a body, and a shock absorber mounted between the axle and the body to absorb shock from vertical movement of the axle and prevent shock from being transmitted completely to the body of the vehicle, the improvement disclosed involves an apparatus for sensing tilt of the vehicle in combination with apparatus in the hydraulic system of the shock absorber which will prevent further tilt of the vehicle beyond a predetermined point sensed by the sensing unit.

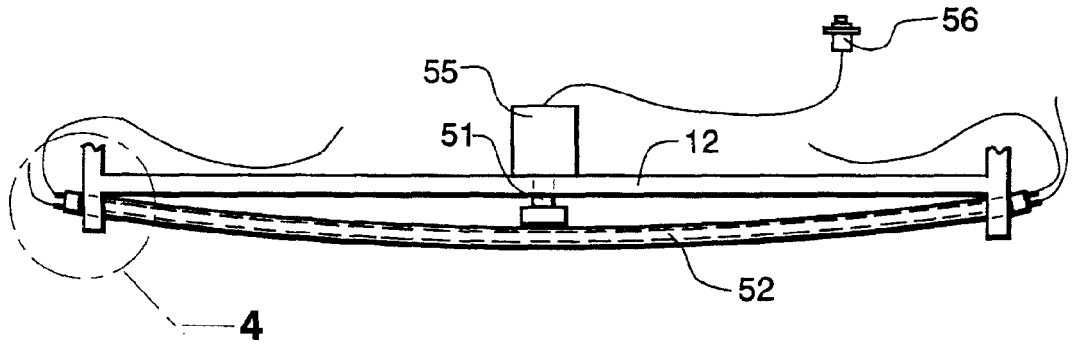

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3 is confirmed.

\* \* \* \* \*